United States Patent
Lu et al.

(10) Patent No.: US 10,068,029 B2
(45) Date of Patent: Sep. 4, 2018

(54) VISUALIZING RELATIONSHIPS IN SURVEY DATA

(71) Applicants: Minghao Lu, Shanghai (CN); Muthuraj Thangavel, Madurai/Tamilnadu (IN)

(72) Inventors: Minghao Lu, Shanghai (CN); Muthuraj Thangavel, Madurai/Tamilnadu (IN)

(73) Assignee: Business Objects Software Ltd., Dublin (IE)

( * ) Notice: Subject to any disclaimer, the term of this patent is extended or adjusted under 35 U.S.C. 154(b) by 707 days.

(21) Appl. No.: 14/496,671

(22) Filed: Sep. 25, 2014

(65) Prior Publication Data
US 2016/0092894 A1   Mar. 31, 2016

(51) Int. Cl.
*G06F 17/30* (2006.01)
*G06Q 30/02* (2012.01)
*G06Q 10/10* (2012.01)

(52) U.S. Cl.
CPC .... *G06F 17/3089* (2013.01); *G06F 17/30867* (2013.01); *G06Q 10/101* (2013.01); *G06Q 30/0203* (2013.01); *G06Q 30/0245* (2013.01)

(58) Field of Classification Search
None
See application file for complete search history.

(56) References Cited

U.S. PATENT DOCUMENTS

| | | | | |
|---|---|---|---|---|
| 2007/0005477 A1* | 1/2007 | McAtamney | ....... | G06F 3/04845 705/35 |
| 2007/0043632 A1* | 2/2007 | Abelow | ............... | G06Q 10/101 705/26.8 |
| 2009/0319344 A1* | 12/2009 | Tepper | ............. | G06Q 10/06393 705/7.39 |
| 2010/0070345 A1* | 3/2010 | Abelow | ............... | G06Q 10/101 705/14.44 |

(Continued)

OTHER PUBLICATIONS

Introducing Tableau 8.2; Tableau Software; Business Intelligence and Analytics; 2 pages; <<http://www.tableausoftware.com/>> [Aug. 4, 20140.

(Continued)

*Primary Examiner* — Gurkanwaljit Singh
(74) *Attorney, Agent, or Firm* — Fish & Richardson P.C.

(57) ABSTRACT

Some examples of visualizing relationships between survey data can be implemented by displaying a user interface including a survey question region and a percentage region. In response to detecting a selection of a survey data set, multiple question objects are displayed in the survey question region. Each question object represents a survey question and an answer option for the survey question. In response to inputs to interact with the multiple question objects, survey results such as a percentage of selections of a first answer option to a first survey question represented by a first question object can be determined and displayed in the user interface. Also, interrelationships between answers to survey questions can be displayed by positioning question objects at different locations in the user interface. In (Continued)

response to a selection of a question object, other question objects can be presented according to the correlation with the selected question object.

19 Claims, 14 Drawing Sheets

(56) References Cited

U.S. PATENT DOCUMENTS

| | | | |
|---|---|---|---|
| 2014/0188559 A1* | 7/2014 | Rebrovick | G06Q 30/0203 705/7.31 |
| 2014/0314215 A1* | 10/2014 | Duva | G06Q 30/0202 379/88.01 |
| 2016/0092989 A1* | 3/2016 | Marsh | G06Q 40/06 705/37 |

OTHER PUBLICATIONS

SurveyMonkey: Free online survey software & questionnaire tool; 2 pages; <<http://www.surveymonkey.com/>> [Aug. 4, 2014].

* cited by examiner

VISUALIZING RELATIONSHIPS IN SURVEY DATA

TECHNICAL FIELD

This disclosure relates to computer-implemented methods, computer-readable media, and computer systems for presenting user interfaces to visualize data in data sets.

BACKGROUND

Surveys are a popular means for data collection, e.g., to better understand customers, markets, products, etc. Surveys serve as links between businesses and consumers. For example, survey data like population survey, health survey, and employee satisfaction survey includes large volumes of data. To extract value out of a survey, the survey data needs to be efficiently and innovatively analyzed. Data visualization models can allow visualizing the survey data in an explorative way, e.g., allowing visualization of interrelationships between survey data. However, the usefulness of the survey data cannot be properly leveraged if the visualization models are time-consuming, hard to understand, limited in interaction, and unable to explore interrelationship between survey data.

SUMMARY

This disclosure describes computer-implemented methods, computer-readable media, and computer systems for presenting user interfaces to visualize relationships in survey data across multiple factors.

Certain aspects of the subject matter described here can be implemented as a method to visualize survey data. A user interface including a survey question region and a percentage region having an axis representing percentages is displayed. A selection of a survey data set that includes multiple survey questions, multiple answers for each survey question, and a number of selections of each answer for each survey question is detected. In response to detecting the selection of the survey data set, multiple question objects are displayed in the survey question region. Each question object represents a survey question and an answer option for the survey question. An input to move a first question object from the survey question region to the percentage region is detected. In response to detecting the input to move the first question object, a percentage of selections of a first answer option to a first survey question represented by the first question object is determined. In the percentage region, a location that represents the determined percentage is identified. The first question object is moved from the survey question region to the identified location. The first question object is displayed in the identified location.

This, and other aspects, can include one or more of the following features. The determined percentage can be a first percentage. A filter region can be displayed in the user interface. An input to move a second question object from the survey question region to the filter region can be detected. In response to detecting the input to move the second question object, a second percentage of selections of a second answer option to a second survey question represented by the second question object can be determined. The second question object can be moved to the filter region, and the second question object and the second percentage can be displayed in the filter region. The identified location can be a first location. A third percentage representing a correlation between the first percentage and the second percentage can be determined. In the percentage region, a second location that represents the third percentage can be identified. The first question object can be moved from the first location to the second location. To determine the third percentage, a percentage of selections of the first answer option to the first survey question represented by the first question object from among the second percentage of selections of the second answer option to a second survey question represented by the second question object can be determined. An input to move a third question object from the survey questioned region to the filter region can be detected. In response, a fourth percentage of selections of a fourth answer option to a third survey question represented by the third question object can be determined. A first percentage representing a correlation between the second percentage and the fourth percentage can be determined. The third question object can be moved to and displayed in the filter region. The fifth percentage can be displayed in the filter region instead of the second percentage. To determine the fifth percentage, a percentage of selections of the fourth answer option to this third survey question can be determined from among the second percentage of selections of the second answer option to a second survey question. A selection of the first question object when the first question object is displayed in the survey questioned region can be detected. In response, multiple correlations can be determined. Each is a correlation between the answer option for the survey question represented by the first question object and an answer option for a survey question represented by each of the remaining question objects. The multiple correlations can be ranked in an order. The remaining question objects can be displayed with visual appearances that correspond to ranks of the multiple correlations. A selection of the first question object in the percentage region can be detected. In response, the percentage can be displayed in the percentage region.

Certain aspects of the subject matter described here can be implemented as a non-transitory computer-readable medium storing instructions executable by data processing apparatus to visualize survey data by implementing operations described here. Certain aspects of the subject matter described here can be implemented as a system that includes one or more computer systems and a computer-readable medium storing instructions executable by the one or more computer systems to visualize survey data by implementing operations described here.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

DETAILED DESCRIPTION

This disclosure describes computer-implemented methods, computer-readable media, and computer systems for presenting user interfaces to visualize relationships in survey data across multiple factors. Fuel to balloon visualization is a new type of data visualization that can enable users to visualize hidden relationships in survey data across multiple factors. A survey is a method of data collection, e.g., through questionnaires. In a survey data set, each question or survey item is a factor and can be analyzed for insights through two ways—direct answer percentage for factors and interrelationship through relative percentage of individual answers to logic applied base filter of combined factors. In the interrelationship mode, comparison to an unfiltered benchmark value is shown to indicate the drop or rise of balloon factor. The techniques described here can be implemented using a real-time analysis model, allowing factors to be added or removed easily from analysis. Users can explore through multiple factors and build the analysis resulting in live that recalculated result of data being shown. The model also has built-in intelligence to highlight the correlated factors for a selected factor to assist a user's exploration of data. The model can be implemented to provide a three-part layout (question-fuel-balloon), which allows a new way to visualize survey data and save time. Not only can different kinds of survey analysis be visualized using a single model, but factors can also be moved around easily to different parts of visualization based on a given scenario. In addition, the data set can easily be replaced, allowing visualization of different survey data sets.

The techniques described in this disclosure can be used to cause computer systems to process data in survey data sets and to present the processed data in user interfaces that will allow a user, e.g., a viewer, of the user interfaces to understand the underlying information that the survey data set represents. For example, in response to simple selections by the user through the user interface, the computer systems that implement the techniques described here can identify interrelationships between different factors of the survey data set. The computer systems can implement animations (described below) to allow the user to visualize the interrelationships. In this manner, the computer systems are improved from being a storage repository for the survey data sets to simple, powerful, and flexible data visualization tools that can enable visualizing hidden relationships in a survey analysis. The experience of the user is also improved because the user is now able to visualize survey data more easily and more interactively.

Figure 1:
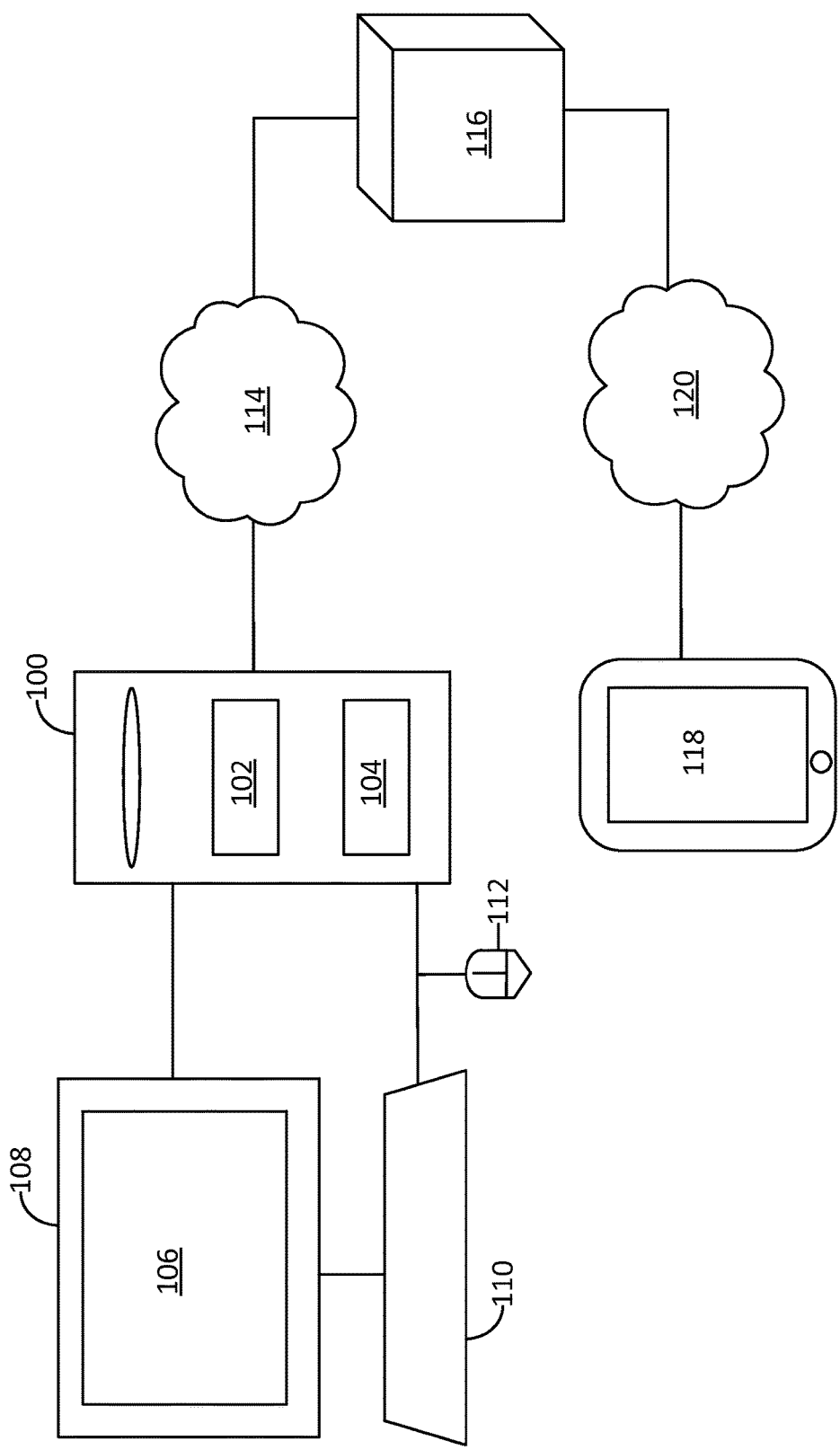
FIG. 1 is a schematic diagram showing computer systems that can present visualizations of survey data.

FIG. 1 is a schematic diagram showing computer systems that can present visualizations of survey data. In some implementations, a computer system 100 can include data processing apparatus 102 (e.g., one or more processors) that can execute computer-readable instructions stored on a computer-readable medium 104 to present visualizations of survey data in user interfaces described below. Survey data sets that include the survey data can be stored locally on the computer system 100 (e.g., on the computer-readable media 104) or remotely on one or more computer-readable media 116. The computer system 100 can be connected to the one or more computer-readable media 116 through one or more wired or wireless networks 114 (e.g., the Internet). The computer system 100 can execute the computer-readable instructions to display one or more user interfaces 106 in a display device 108 connected to the computer system 100. The computer system 100 can also be connected to input devices (e.g., a keyboard 110, a mouse 112, or other input devices) using which a user can interact with the user interfaces 106 as described below. In some implementations, the computer system 100 can be a desktop computer, a laptop computer, a client computer device connected to a server computer system, or other computer system. In some implementations, a mobile computer system 118 (e.g., a smart phone, a tablet computer, a personal digital assistant, or other mobile computer system) can implement the computer-implemented methods to present visualizations of survey data. In such implementations, the user can interact with the mobile computer system 118 using touch inputs, stylus inputs, track ball inputs, audio inputs, or other types of inputs with or without a keyboard or a mouse.

Example implementations of data visualization are described here with reference to survey data sets. A survey data set includes multiple survey questions, multiple answers for each survey question, and a number of selections of each answer for each survey question. In situations in which the survey data set includes open text fields, e.g., names of survey participants, such open text fields can be disregarded during data analysis and visualization. Alternatively, the survey data set can be anonymous and exclude any open text fields. Survey questions can be structured like questions, e.g., "what is your age?," "do you like coffee?," "what kind of products to you like?," or other questions. The survey data set can include a short question field defined for all questions. For example, a question such as "do you believe in the leaders of your company?" can have a short question field such as "belief in leaders" for easy and effective representation in visualization. Each question can have multiple answer options (e.g., less than, equal to or more than five answer options) or yes/no as answer options, other answer options defined by a psychometric scale (e.g., Likert scale) or combinations of them. For example, for the question "what is your age?," the answer options can include "0-20," "20-30," "30-40," and "50 and up." In another example, for the question field "Like coffee," the answer options can include "strongly disagree," "disagree," "neutral," "agree," "strongly agree." In a further example, for the question field "products that I like: coffee, tea," the answer options can include "coffee (yes)" and "tea (no)."

The survey data set can be stored in a table that includes multiple rows and columns. For example, each column can represent a survey question. Each column can include multiple rows, each of which represents a survey answer. The value in a cell formed by an intersection of a row and a column can represent a number of selections of an answer represented by the row to a question represented by the column. For example, a column in the table can represent the question "what is your age?" The column can include four rows, each representing one of the answer options "0-20," "20-30," "30-40," and "50 and up." A cell formed by an intersection of the rule representing the answer option "0-20" and the column representing the question "what is your age?" can store a value, e.g., 35, indicating that 35 people of the total number of surveyed people answered "0-20" in response to the question. The survey data set can include any number of columns to represent any number of survey questions and, for each column, multiple rows to represent answer options to each survey question. In some implementations, the survey data set can be stored in a normalized table. The questions can be maintained in one table with corresponding identifiers, e.g., question numbers or other identifiers. The answers can be maintained in another table with corresponding identifiers, e.g., answer numbers or other identifiers. Each answer corresponds to a unique question number. Example user interfaces to visualize the data in the survey data set are described below with reference to FIGS. 2A-2J. The data visualization techniques described here can be implemented for any type of data set in which the data is structured similarly to survey data sets.

Figure 2A:
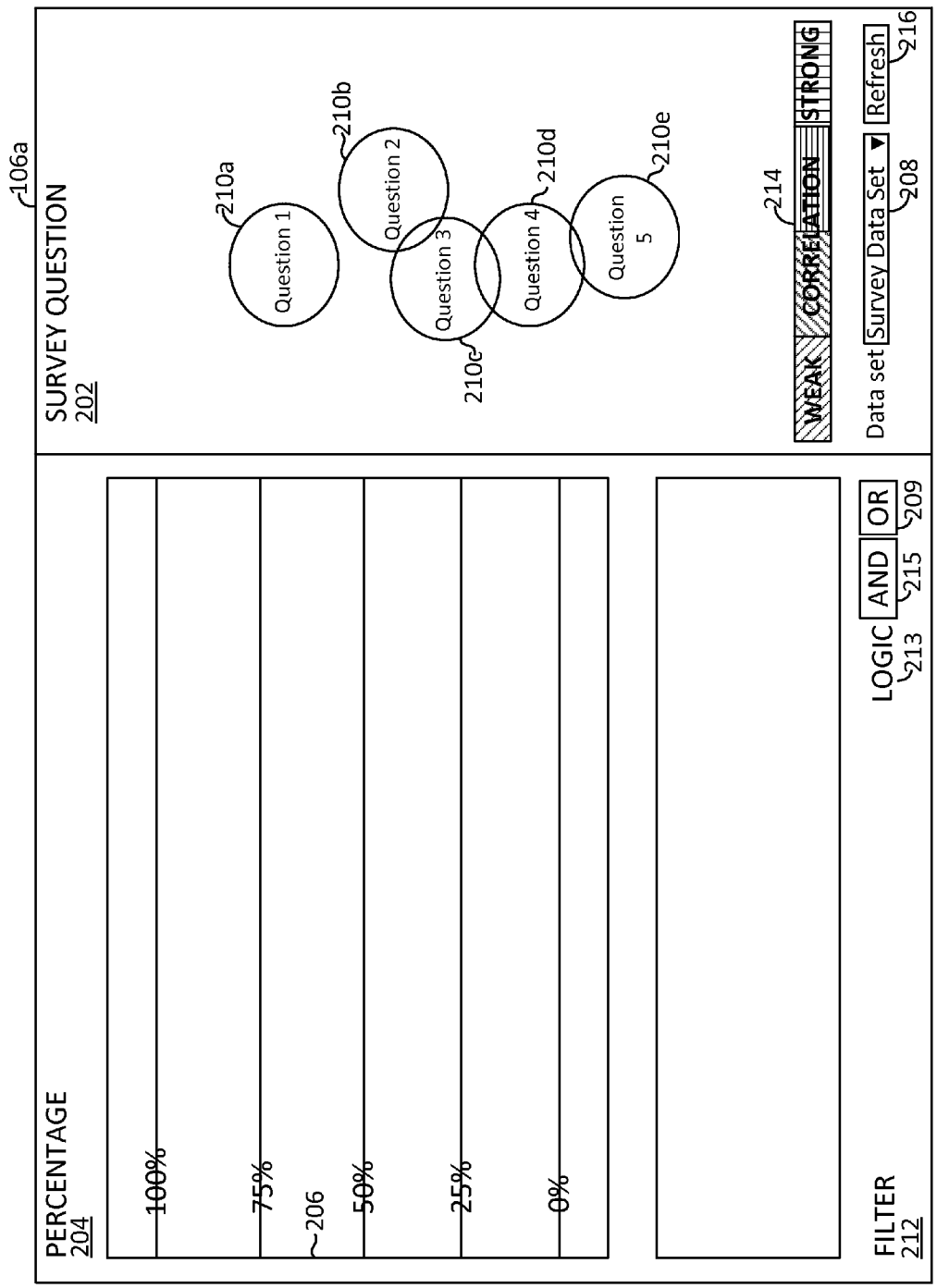
FIGS. 2A-2J are schematic diagrams showing user interfaces to present visualizations of survey data.

FIGS. 2A-2J are schematic diagrams showing user interfaces to present visualizations of survey data. FIG. 2A shows an example user interface 106a that the computer system 100 displays in the display device 108 in response to a user selecting a survey data set for visualization. In the user interface 106a, the computer system 100 displays a survey question region 202 and a percentage region 204 having an axis 206 representing percentages. The computer system 100 also displays a selectable data set object 208 in the user interface 106a. In some implementations, a user of the computer system 100 can select a survey data set for visualization by selecting the data set object 208, e.g., using an input device.

In some implementations, in response to the selection of the data set object 208 through the user interface 106a, the computer system 100 can display a drop-down list of names of survey data sets that can be visualized. Using the input device, the user can select one of the names displayed in the drop-down list. Alternatively, the user can select an option to select a survey data set that is not included in the drop-down list. In response to the selection of a survey data set, the computer system 100 can access a computer-readable medium (e.g., the local computer-readable medium 104 or the remote computer-readable media 116 or other computer-readable medium) on which the selected survey data set is stored. As described above, the survey data set can include multiple columns, each representing a survey question, and multiple rows, each representing an answer to the survey question. The computer system 100 can generate multiple question objects, each representing a survey question. To each question object, the computer system 100 can associate a default answer option (e.g., the first answer option or the answer option with the highest number of selections). As described below, the user can provide input to change the default answer option to a different answer option.

The computer system 100 can display the multiple question objects (e.g., the first question object 210a, the second question object 210b, the third question object 210c, the fourth question object 210d, the fifth question object 210e, or more or fewer question objects) in the survey question region 202 as shown in FIG. 2A. Each question object represents both a survey question and an answer option (e.g., the default answer option) for the survey question. In each question object, the computer system 100 can display the survey question that the question object represents. In some implementations, each question object is displayed as a circle or other geometric or non-geometric shape. Each question object can be displayed in any manner, e.g., as a balloon to provide the balloon visualization.

Figure 2B:
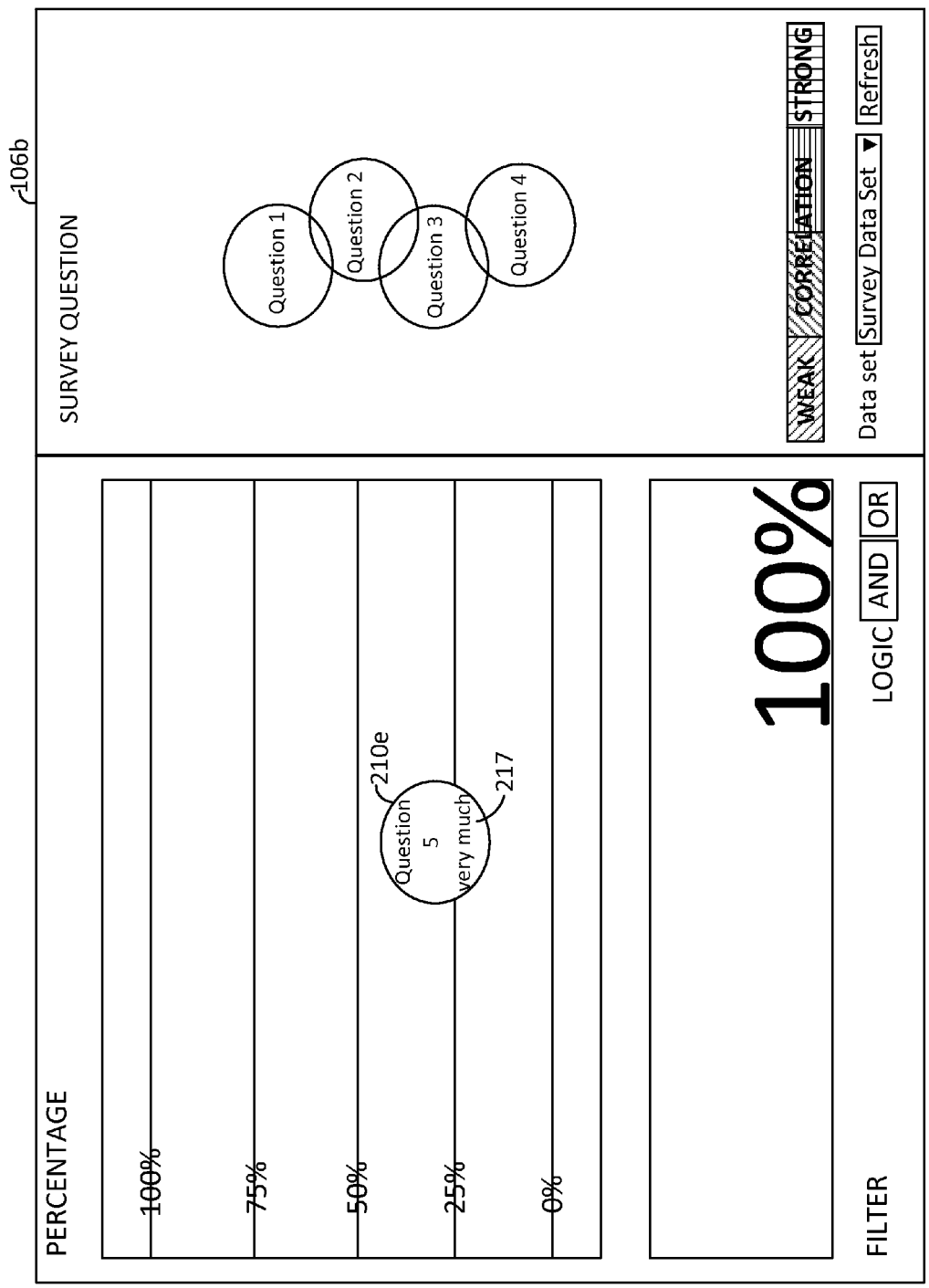

The computer system 100 can display a visualization representing a percentage of selections of an answer option to a survey question represented by a question object in response to a simple selection operation (e.g., a drag-and-drop operation, a copy/paste operation, a cut/paste operation, or other selection operation) of the question object onto the percentage region 204, as shown in user interface 106b in FIG. 2B. For example, the user selects question object 210e that is displayed in the survey question region 202 using an input device or, in the case of the mobile computer system 118, using a touch input. The user performs a selection operation of the question object 210e from the survey question region 202 to the percentage region 204. The computer system 100 detects the selection of the question object 210e. The computer system 100 identifies the survey question and the answer option represented by the question object 210e.

The computer system 100 determines a percentage of selections of the answer option to the survey question represented by the question object 210e. For example, the question object 210e can represent the question "Like coffee" and the answer option "strongly agree" from among the multiple answer options "strongly disagree," "disagree," "neutral," "agree," "strongly agree." Out of 100 survey participants, 35 can have selected "strongly agree." The computer system can determine that the percentage of selections of "strongly agree" to the question "Like coffee" is 27%. On the axis 206 in the percentage region 204, the computer system 100 can identify a location that represents the percentage described above. In response to the drag-and-drop operation on the question object 210e, the computer system 100 can move the question object 210e from the survey question region 202 to the percentage region 204 and display the question object 210e at the identified location that represents the percentage. In addition, the computer system 100 can display the answer option 217 represented by the question object 210e in the question object 210e. In this manner, a simple selection operation of a question object onto the percentage region 204 can simply and instantly show the user the survey question, the answer option to the survey question, and a percentage of selections of the answer option to the survey question represented by the question object.

Figure 2C:
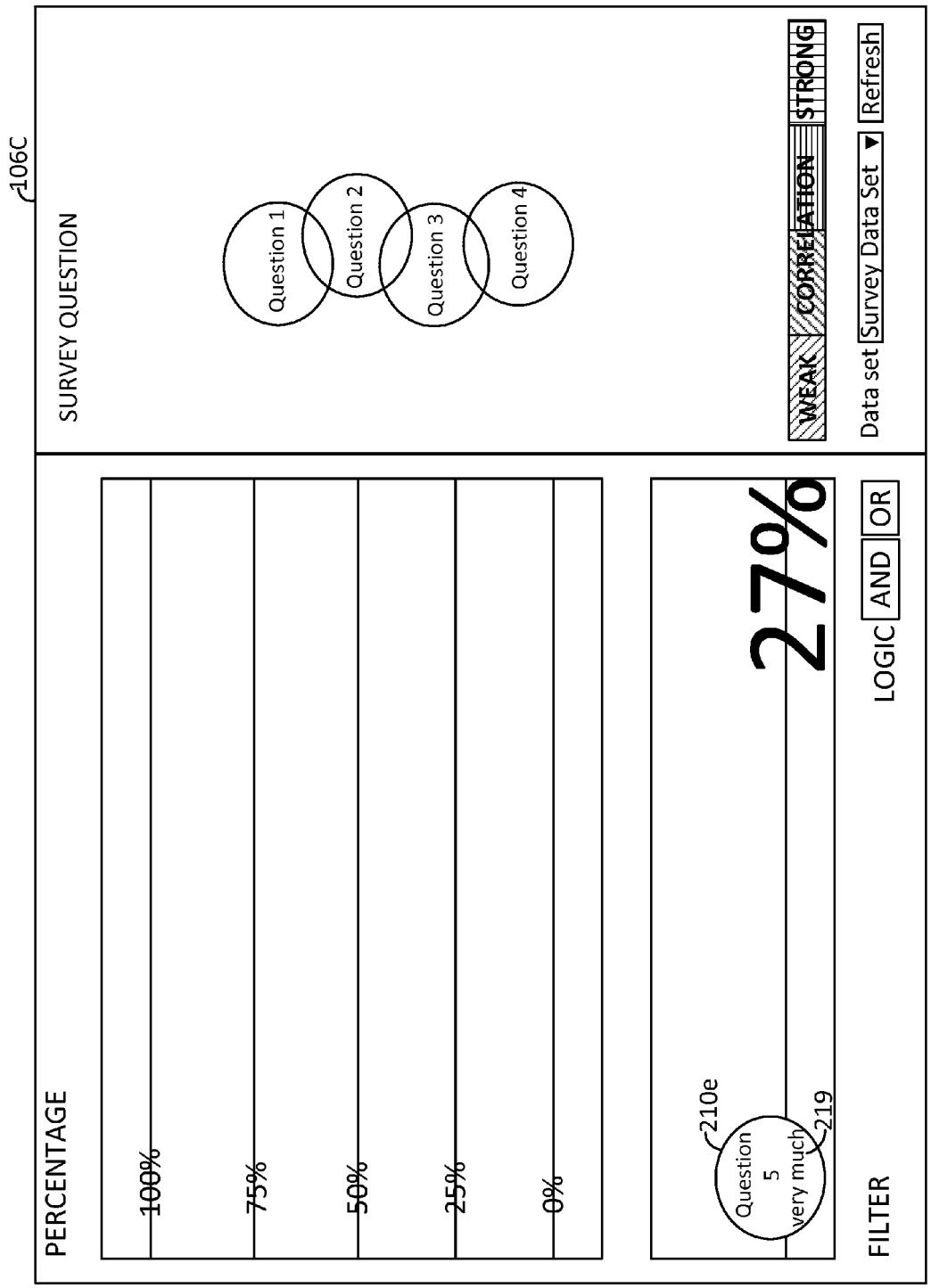

In some implementations, the computer system 100 can display the percentage in the user interface 106b. For example, the user can position a position indicator (e.g., a cursor, a mouse, or other position indicator) on the question object 210e in an operation such as a mouseover operation. The computer system 100 can determine the positioning of the position indicator on the question object 210e and, responsively, display the percentage adjacent to (e.g., inside or outside) the question object 210e. In addition, the computer system 100 can display a horizontal line extending from the question object 210e (e.g., a center of the question object 210e) to the axis 206. The position at which the axis 206 intersects the horizontal line can correspond to the percentage described above. In some implementations, the computer system 100 can display a filter region 212 in the user interface. As shown in FIG. 2C (user interface 106c), the user can perform a selection operation of a question object (e.g., the question object 210e) from the survey question region 202 to the filter region 212. In response, the computer system 100 can display the question object 210e in the filter region 212 and display the percentage described above in the filter region 212.

Figure 2D:
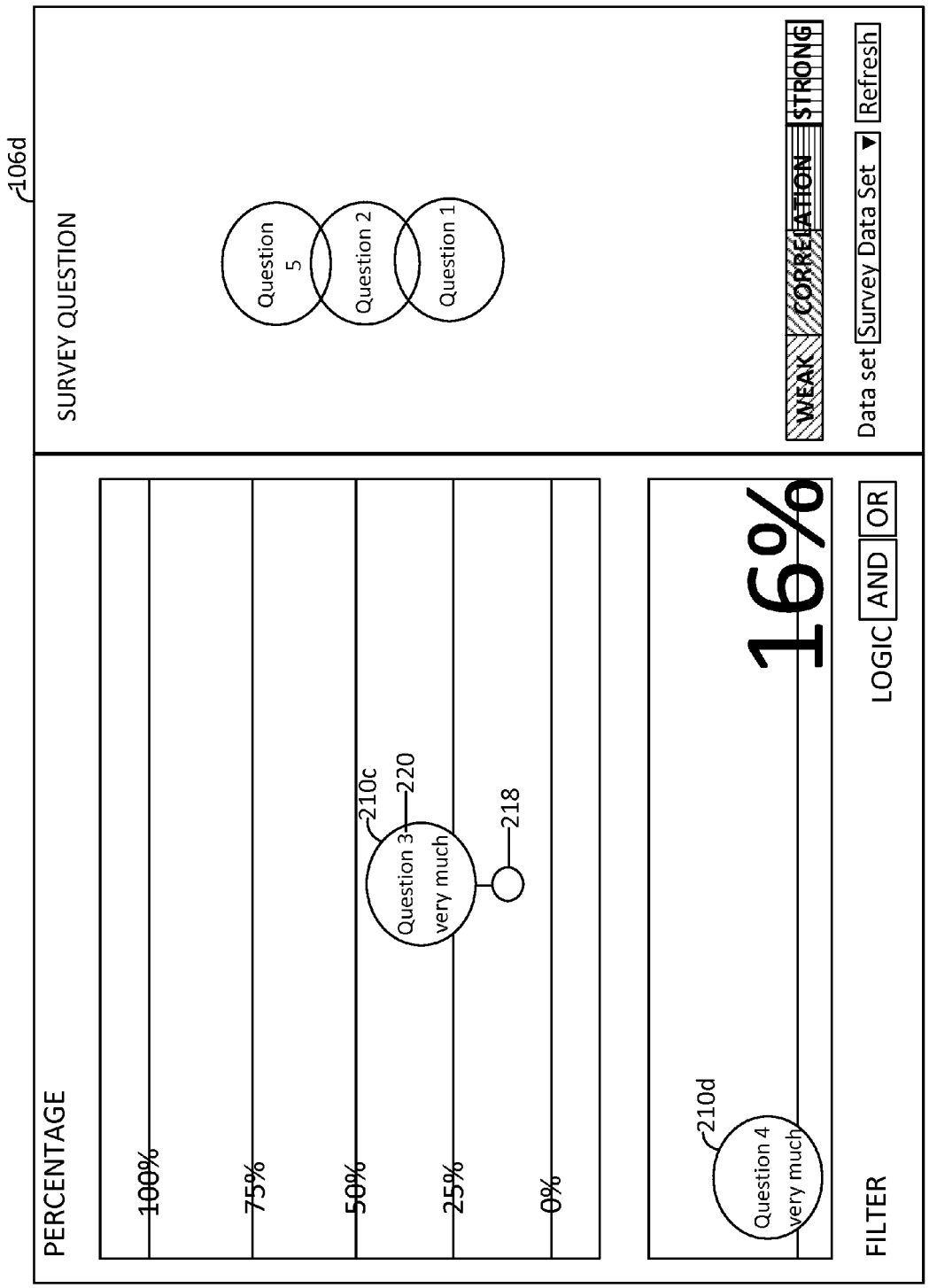
Figure 2E:
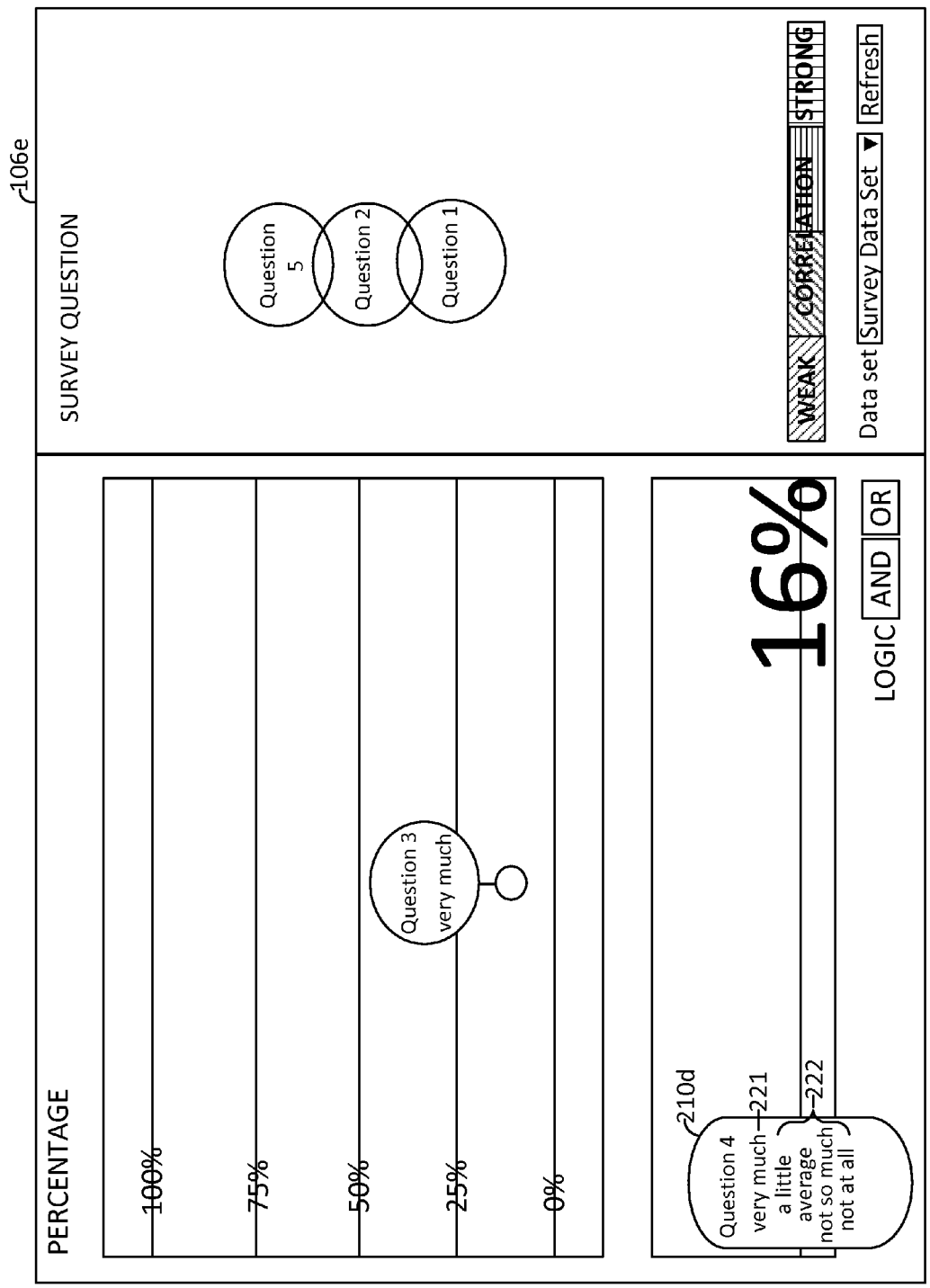

In some implementations, the computer system 100 can display a visualization representing an interrelationship between an answer option to a first question and an answer option to a second question in the survey, as described with reference to FIG. 2D (user interface 106d). The user can perform the selection operation to cause the computer system 100 to display the question object 210c in the percentage region 204. In response, the computer system 100 can display the question object 210c in the percentage region 204 at a location that represents a percentage of selections of the answer option to the survey question represented by the question object 210c. The user can then perform the selection operation to cause the computer system 100 displaying the question object 210*d* in the filter region 212. In response, the computer system 100 can display the question object 210*d* in the filter region 212 and display the percentage of selections of the answer option to the survey question represented by the question object 210*d* in the filter region 212.

The answer option represented by the question object 210*d* and the answer option represented by the question object 210*c* can be interrelated. For example, the answer option represented by the question object 210*d* can be "strongly agree" to the question "like coffee." The answer option represented by the question object 210*c* can be "agree" to the question "like cola." In response to the user performing the selection operation to cause the computer system 100 to display the question object 210*d* in the filter region 212, the computer system 100 can determine a percentage of selections of the answer option to the survey question represented by the question object 210*c*. For example, 35% (a first percentage) of a total of 100 survey participants can have selected "strongly agree" to the question "like coffee." Also, 16% (a second percentage) of the total of 100 survey participants can have selected "agree" to the question "like cola." From among the 16% of survey participants who selected "agree" to the question "like cola," the computer system 100 can determine a third percentage who selected "strongly agree" to the question "like coffee." That is, the third percentage represents the correlation between the percentage of selections of the answer option represented by the question object 210*c* and the percentage of selections of the answer option represented by the question object 210*d*.

In the percentage region 204, the computer system 100 can move the question object 210*c* from the location that represents the first percentage to a new location 220 that represents the third percentage. To allow the user to visualize both the first and third percentages, the computer system 100 can display an object 218 at the location that represents the first percentage and the question object 210*c* at the new location that represents the third percentage. In response to the user positioning a position indicator on the question object 210*c* or on the object 218, the computer system 100 can display a horizontal line connecting the question object 210*c* to the axis 206 and display the third percentage adjacent the question object 210*c*. Simultaneously, the computer system 100 can display a horizontal line connecting the object 218 to the axis 206 and display the first percentage adjacent the object 218.

The third percentage can be greater than or less than the first percentage. In some implementations, the computer system 100 can execute an animation that causes the question object 210*c* to move from the location that represents the first percentage to the new location to 220. The animation can give an appearance of the question object 210*c* either rising or falling to the new location 220. The user can thus visualize the answer option and/or the survey question represented by the question object 210*d* as fuelling the correlation with the answer option and/or the survey question represented by the question object 210*e*. Also, by performing a mouseover operation or a touch operation on the question object 210*c* and/or the object 218, the user can see the percentages on the user interface 106*d*. Conversely, to visualize an effect of the answer option to the survey question represented by the question object 210*c* on the answer option to the survey question represented by the question object 210*d*, the user can move the question object 210*c* to the filter region 212 and the question object 210*d* to the percentage region 204.

As described above, a survey question includes multiple answer options, and a question object represents one of the answer options, e.g., a default answer option. The user can provide input to replace the default answer option with another answer option as described with reference to FIG. 2E (user interface 106*e*). In response to user input, the computer system 100 displays the question object 210*d* in the filter region 212. In the question object 210*d*, the computer system 100 displays the default answer option 221. The computer system 100 detects a selection of the question object 210*d* using an input device. For example, the user can perform a mouse-click operation, a touch operation, or a different selection operation on the question object 210*d*. In response, the computer system 100 can determine the answer options associated with the survey question represented by the question object 210*d*. To do so, the computer system 100 can identify the column that represents the survey question and identify each row in the column that represents each answer option for the survey question.

The computer system 100 can display remaining answer options 222 associated with the survey question with the default answer option 221 in the user interface 106*e*. For example, the computer system 100 can increase a size of the question object 210*d* and display the default answer option 221 and all the remaining answer options 222 within the question object 210*d*. Alternatively, the computer system can display all the answer options in another portion of the user interface 106*e*. Each displayed answer option can be selectable such that a selected answer option replaces the default answer option. The user can select one of the remaining answer options 222 using an input device. In response to the user selecting one of the remaining answer options, the computer system 100 can identify the value in the cell at the intersection of the row represented by the selected answer option and the column represented by the survey question. The computer system 100 can determine percentages such as those described above for the identified value and update the user interface accordingly. In the example described with reference to user interface 106*e*, the question object was displayed in the filter region 212. Similar operations to replace the default answer option with a different answer option can be executed when the question object is displayed in the percentage region 204.

Figure 2F:
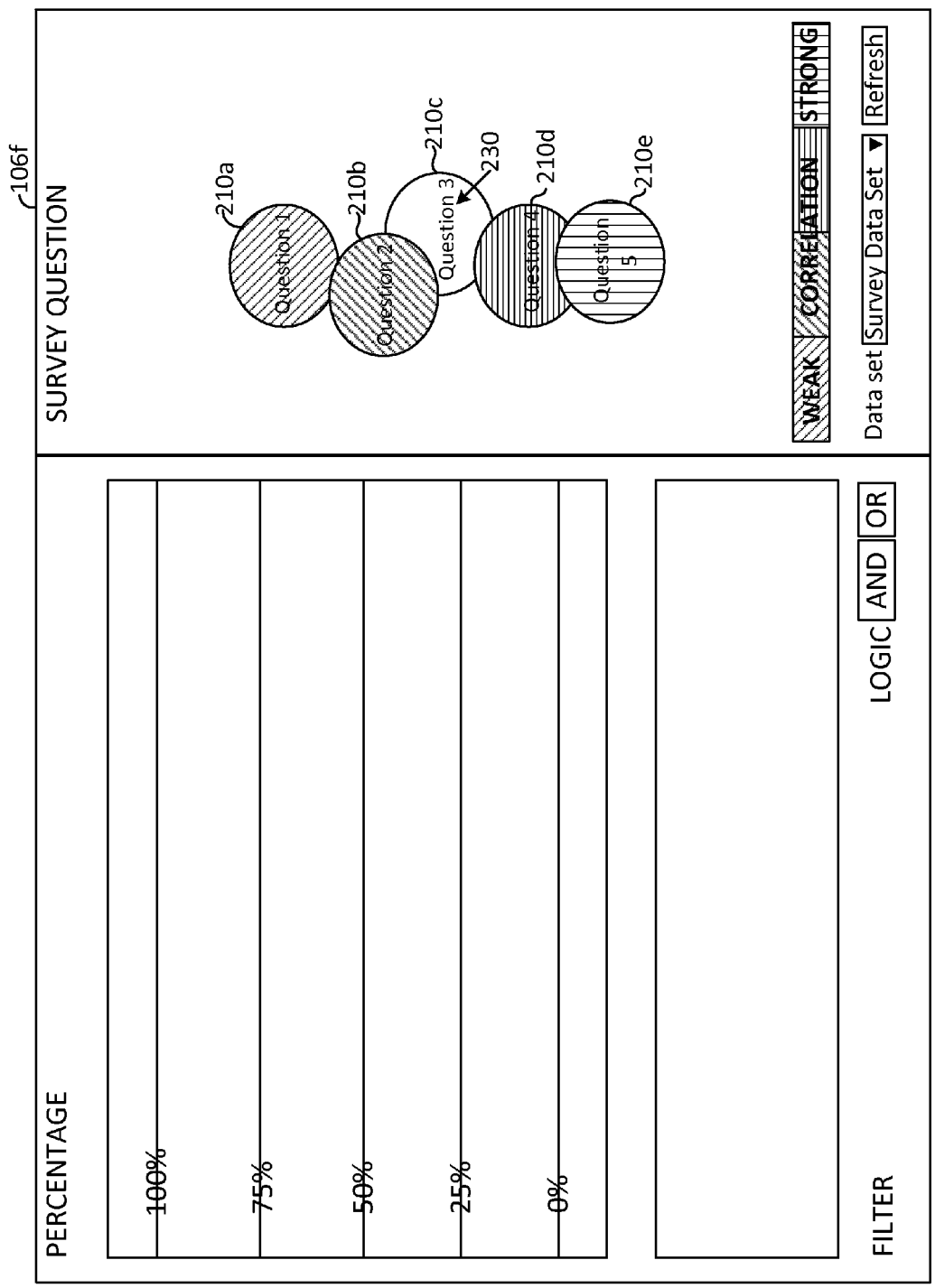

In some implementations, the computer system 100 can visually display correlations between the answer option represented by one question object and answer options represented by other question objects in the survey data set to the user as described with reference to FIG. 2F (user interface 106*f*). As described above, the computer system 100 can display multiple question objects in the survey region 202 in response to the user selecting a survey data set using the data set object 208. Prior to or instead of visualizing a correlation between an answer option represented by a first question object and an answer option represented by a second question object, the user may want to see correlations between the answer option represented by the first question object and answers represented by the remaining question objects in the survey data set. To do so, the user can select one of the question objects displayed in the survey region 202 (e.g., question object 210*c*). For example, the user can perform a mouseover operation to position a position indicator over the question object 210*c* or select (e.g., click on) the question object 210*c*. Alternatively, the user can provide a touch input on the question object 210*c*.

In response, the computer system 100 can determine multiple correlations. Each correlation can be a correlation between the answer option for the survey question represented by the question object 210c and an answer option for a survey question represented by each of the remaining question objects (i.e., question object 210a, question object 210b, question object 210d, and question object 210e). To determine the correlation between the answer option for the survey question represented by the question object 210c and the answer option for the survey question represented by the question object 210b, the computer system 100 can determine a percentage of survey participants who selected the answer option represented by the question object 210b from among the survey participants who selected the answer option for the survey question represented by the question object 210c. Similarly, to determine the correlation between the answer option for the survey question represented by the question object 210c and the answer option for the survey question represented by the question object 210e, the computer system 100 can determine a percentage of survey participants who selected the answer option represented by the question object 210e from among the survey participants who selected the answer option for the survey question represented by the question object 210c.

The computer system 100 can rank the multiple correlations in an order, e.g., an increasing order or a decreasing order. The computer system 100 can associate a visual appearance with each question object that is based on the rank of the correlation between the question object and the question object that the user selected. For example, the computer system 100 can display the question object with the weakest correlation (i.e., having the lowest correlation rank) with a gray color and the question object with the strongest correlation (i.e. having the highest correlation rank) with an orange color, and display the question objects with intermediate correlations with a color that transitions from gray to orange. In some implementations, the user interface 106f can include a correlation indicator 214 that shows the different visual appearances associated with the different correlation ranks.

In this manner, the user's analysis can be made easier as the user is now aware of different levels of correlations between a question object that the user wants to select and other question objects. The visual presentation of question objects based on their respective correlations with another question object can allow the user to choose question objects for closer evaluation. For example, the user interface 106f shows that the answer option represented by the question object 210e has the strongest correlation with the answer option represented by the question object 210c. Based on such visual communication, the user can select the question objects 210c and 210e for further evaluation. For example, the user can move the question object 210c to the percentage region 204 to view a percentage of selections of the answer option to the survey question represented by the question object 210c in the percentage region 204. Subsequently, the user can move the question object 210e to the filter region 212 view a percentage of selections of the answer option to the survey question represented by the question object 210e in the filter region 212. As described above, the computer system 100 adjusts the location of the question object 210c in the percentage region 204 based on the correlation between the answer option represented by the question object 210c and the answer option represented by the question object 210e.

Figure 2G:
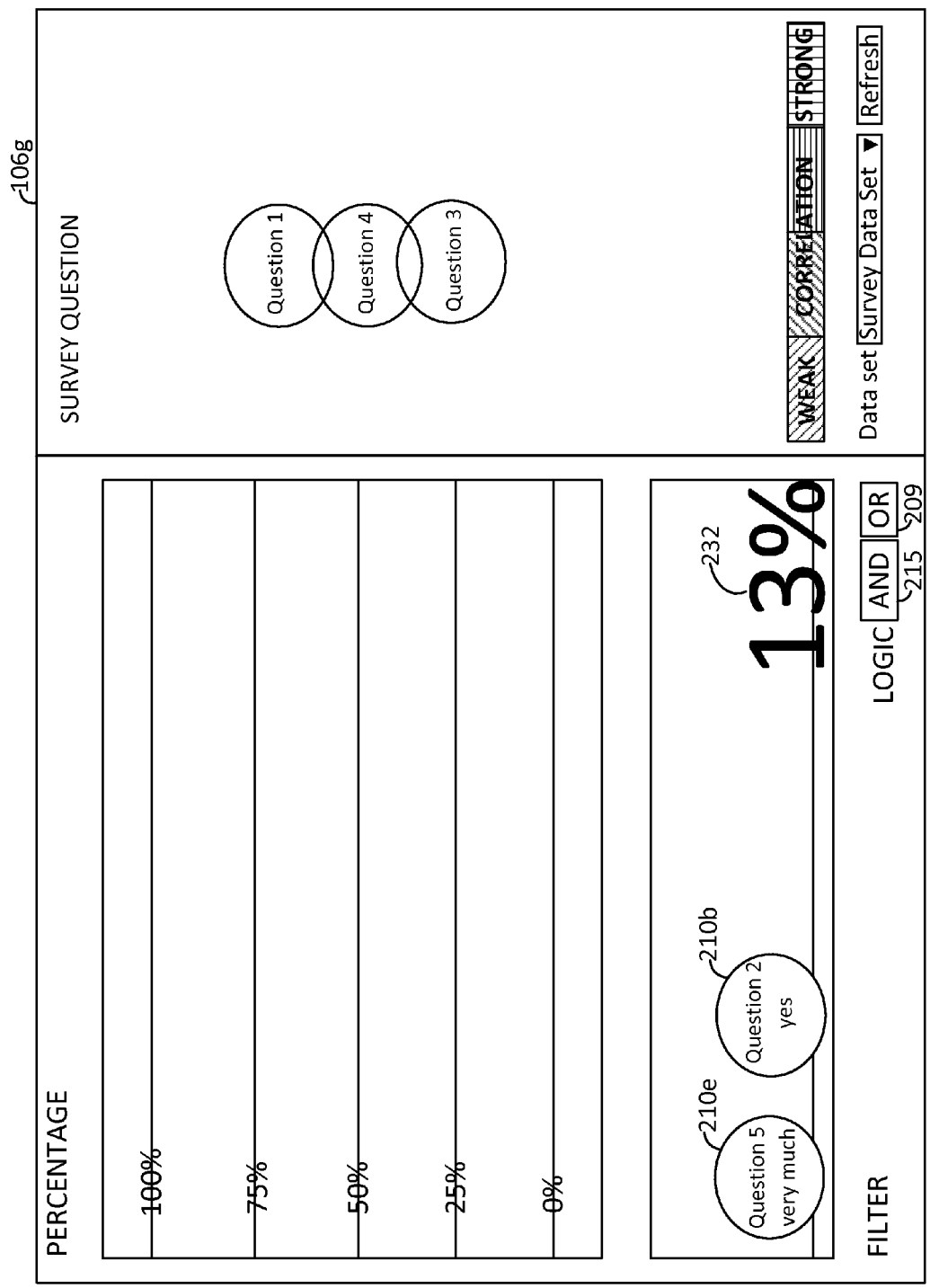
Figure 2H:
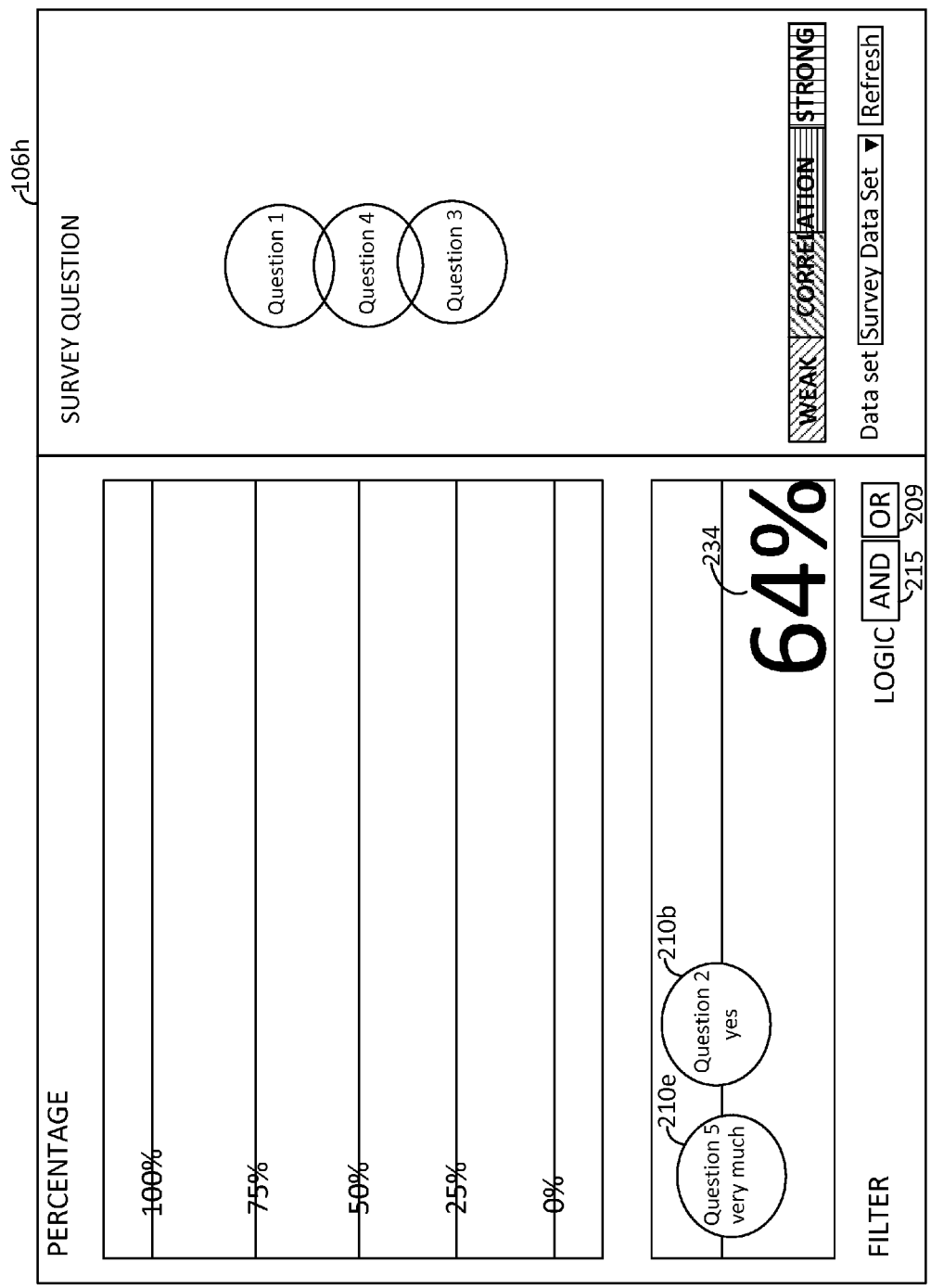

In some implementations, the computer system 100 can allow a user to perform different Boolean operations when visualizing the survey data as described with reference to FIG. 2G (user interface 106g) and FIG. 2H (user interface 106h). In the user interface 106g, the Boolean AND operator 215 is active. In response to input, the computer system 100 moves the question object 210e from the survey question region 202 to the filter region 212, as described above. In addition, the computer system 100 determines a percentage of selections of the answer option to the survey question represented by the question object 210e and displays the determined percentage in the filter region 212, as described above. Subsequently, the computer system 100 moves the question object 210b from the survey question region 202 to the filter region 212. The computer system 100 determines a combined percentage that represents selections of the answer option to the survey question represented by the question object 210e and selections of the answer option to the survey question represented by the question object 210b, and displays the combined percentage 232 in place of the previously determined percentage in the filter region 212.

In the user interface 106h, the user can select the Boolean OR operator 209 instead of the Boolean AND operator 215. In response, the computer system 100 can activate the Boolean OR operator 209. The computer system 100 can then determine a combined percentage that represents selections of the answer option to the survey question represented by the question object 210e or selections of the answer option to the survey question represented by the question object 210b, and display the combined percentage in place of the previous combined percentage 234 in the filter region 212. Similar to the Boolean AND operator and the Boolean OR operator, the computer system 100 can display other Boolean operators in the user interface and determine combined percentages based on a selected Boolean operator.

Figure 2I:
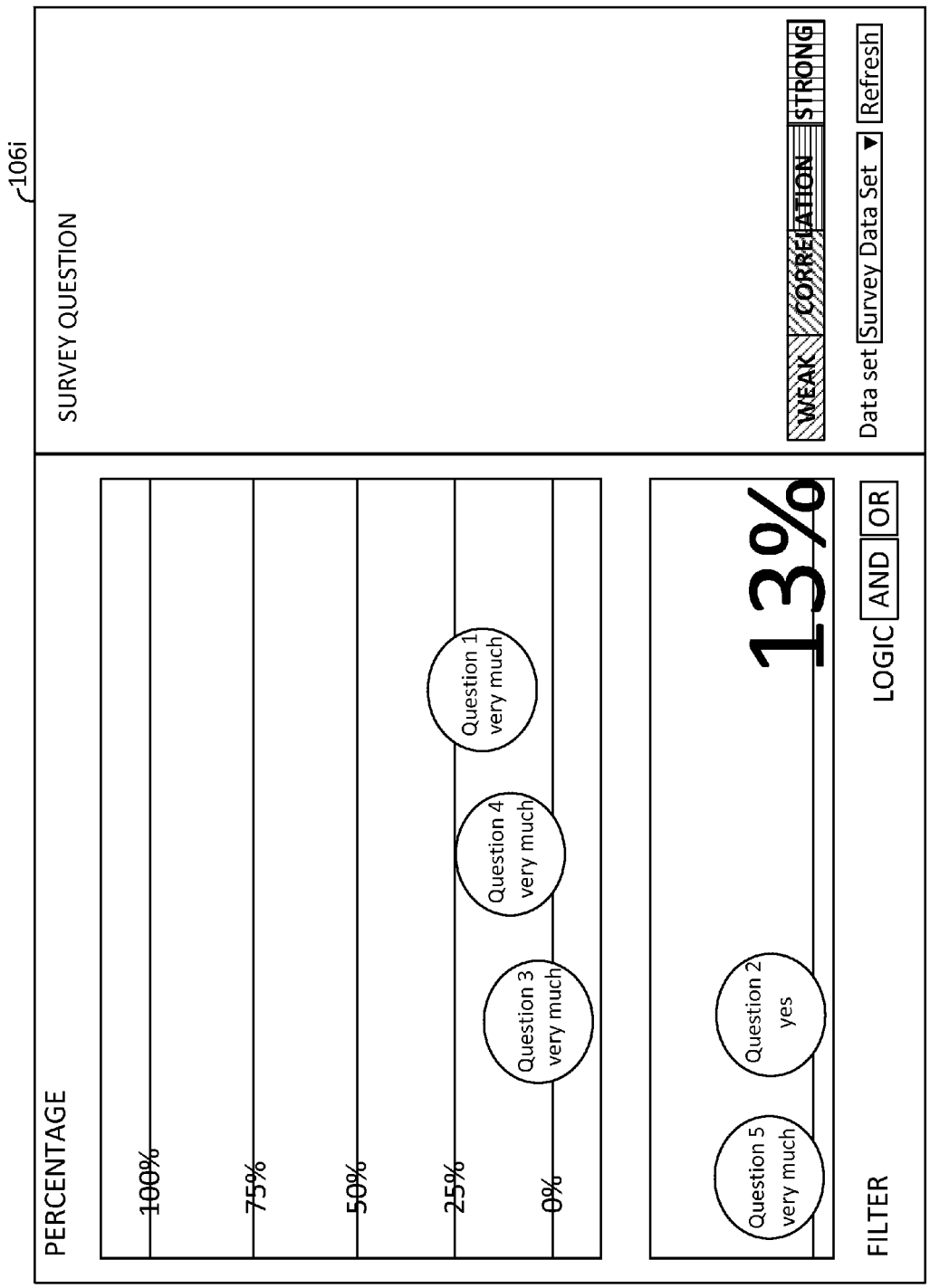
Figure 2J:
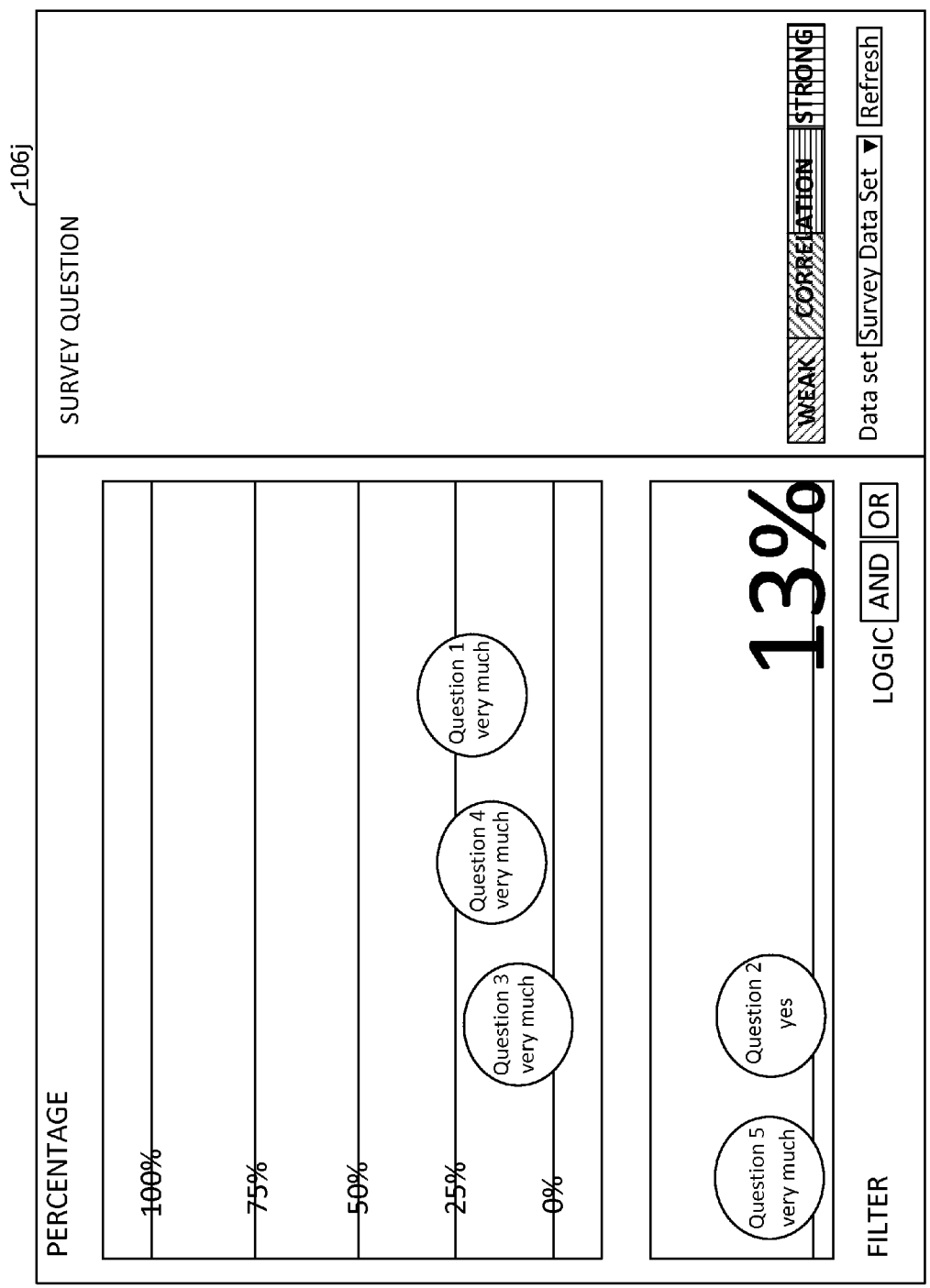

Example techniques were described above to display visualizations of an interrelationship between answer options represented by two question objects. Similar techniques can be implemented to display visualizations of interrelationships between multiple answer options represented by multiple question objects as shown in the user interface 106i (FIG. 2I). In the user interface 106i, the user has moved two question objects to the filter region 212 and three question objects to the percentage region 204. The computer system 100 determines a combined percentage that represents selections of the answer options represented by the question objects displayed in the filter region 212 based on the activated Boolean operator and displays the combined percentage in the filter region. In addition, the computer system 100 determines respective percentages for the three question objects displayed in the percentage region 204 and displays the three question objects at respective locations that correspond to the determined percentages. By selecting a question object, the user can change the answer option represented by the question object. Doing so can cause the computer system 102 to determine revised percentages based on the selections of the changed answer option to the survey question represented by the question object. Accordingly, the computer system 102 can update the user interface by moving other answer objects to different locations or displaying the revised percentages in the user interface or both.

To restart the visualization processes, the user can select the refresh object 216 displayed in the user interface. In response, the computer system 100 can move the question objects from the percentage region 204 or the filter region 212 to the survey question region 202. As shown in FIG. 2A, the computer system 100 can display the question objects to be contacting or overlapping each other to visually communicate the correlation between the survey questions represented by the question objects. In this manner, the techniques described here allow visualizing interrelationships, percentages, and correlation between survey data in a three-section layout.

Figure 3A:
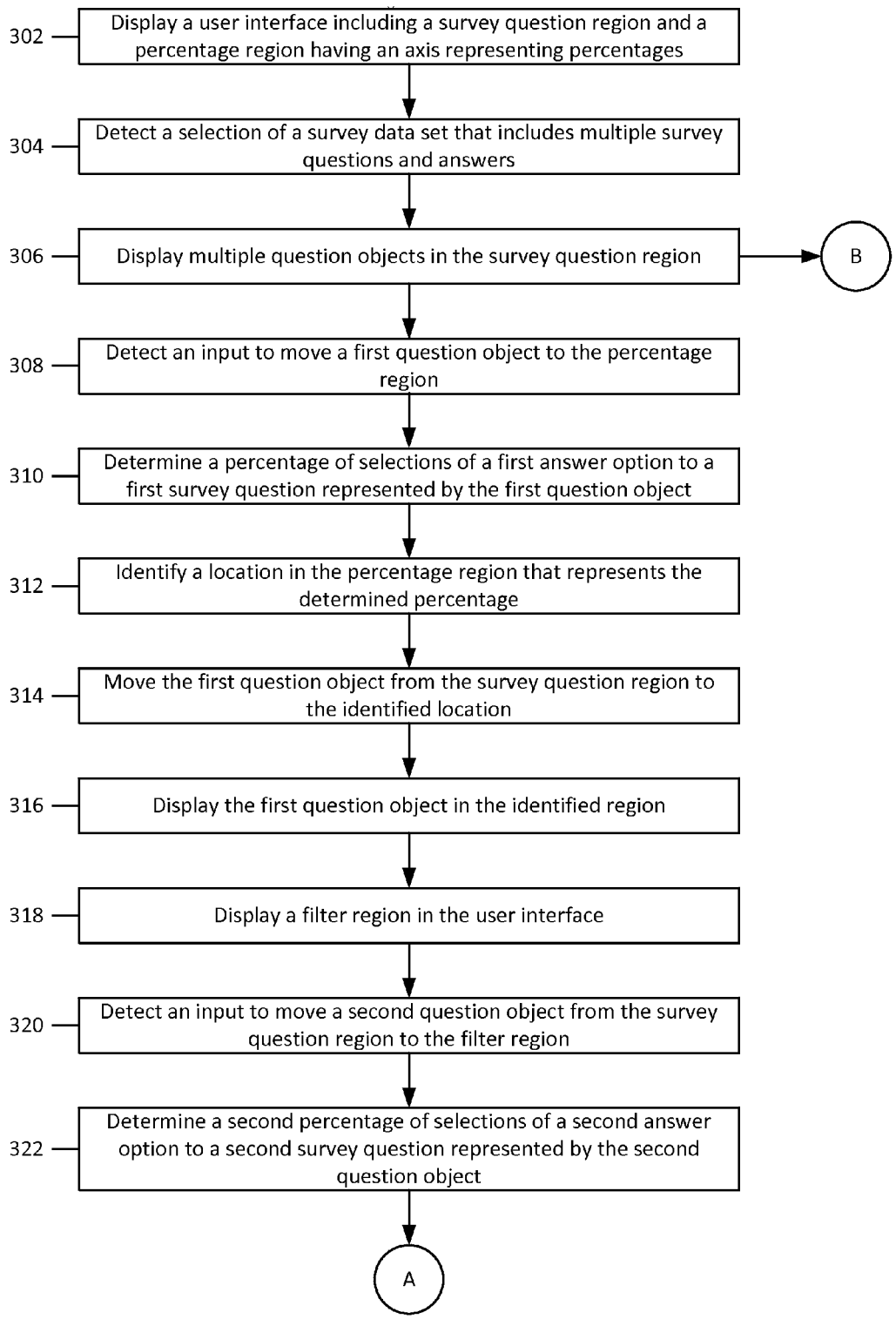
FIGS. 3A-3C are flowcharts showing a process to present visualizations of survey data.
Figure 3B:
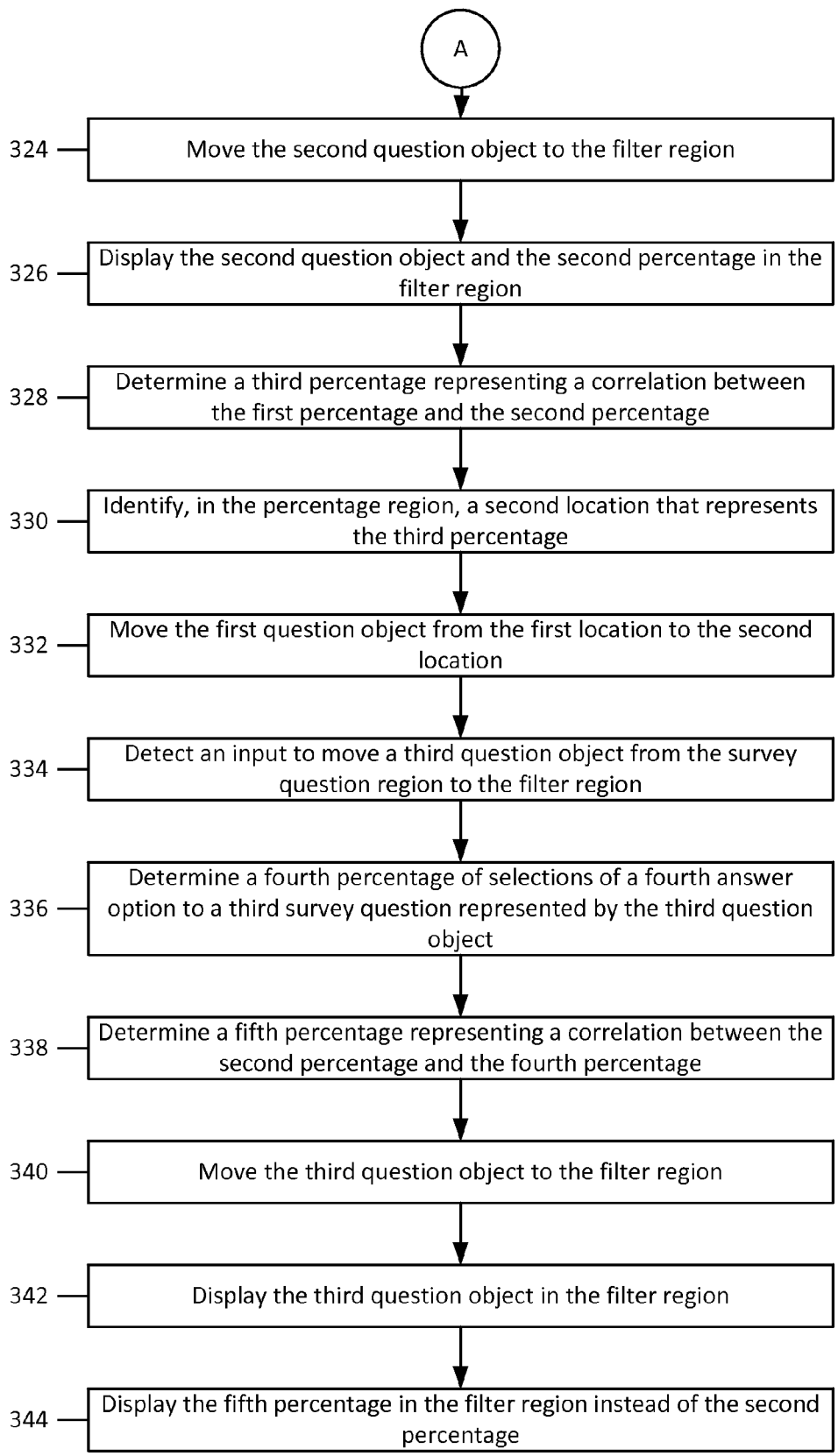
Figure 3C:
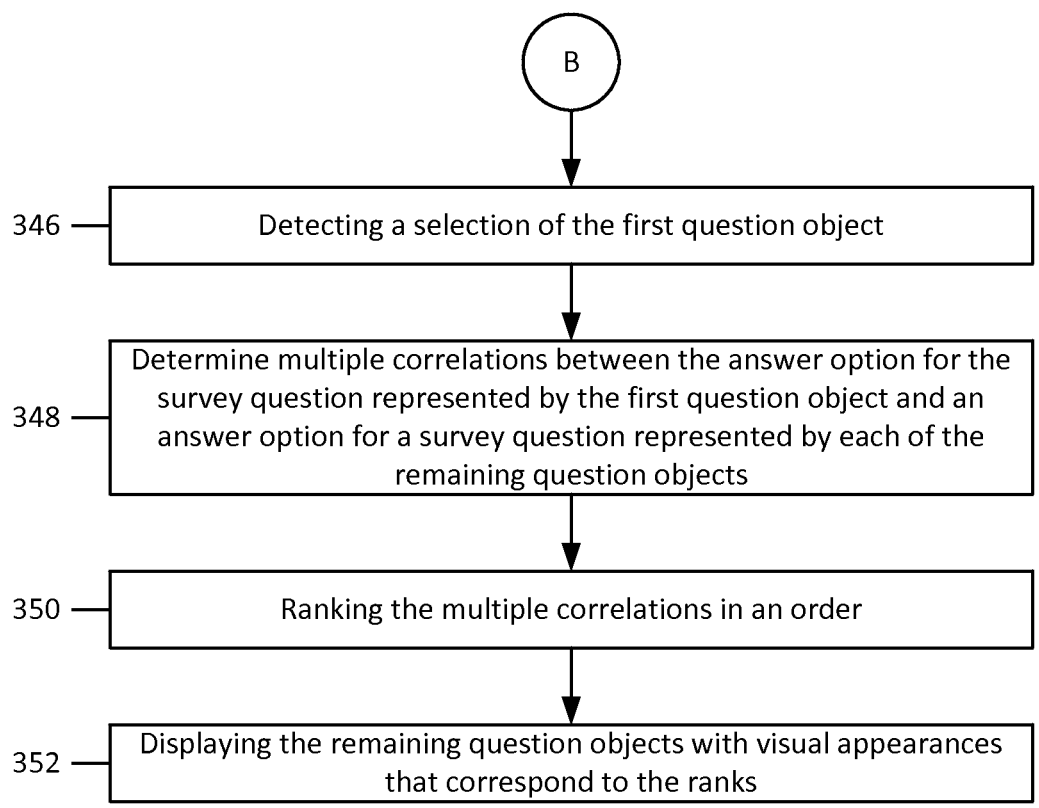

FIGS. 3A-3C are flowcharts showing a process 300 to present visualizations of survey data. The process 300 can be implemented as computer instructions stored on computer-readable media (for example, the computer-readable medium 104) and executable by data processing apparatus (for example, data processing apparatus 102). For example, the process 300 can be implemented by the computer system 100. At 302, a user interface including a survey question region and a percentage region having an axis representing percentages is displayed. At 304, a selection of a survey data set that includes multiple survey questions and answers is detected. At 306, multiple question objects are displayed in the survey question region in response to the selection of the survey data set. At 308, input to move a first question object to the percentage region is detected. At 310, a percentage of selections of a first answer option to a first survey question represented by the first question object is determined. At 312, a location in the percentage region that represents the determined percentage is identified. At 314, the first question object is moved from the survey question region to the identified location. At 316, the first question object is displayed in the identified region.

At 318, a filter region is displayed in the user interface. In some implementations, the filter region is displayed together with the survey question region and the percentage region. At 320, an input to move a second question object from the survey question region to the filter region is detected. At 322, a second percentage of selections of a second answer option to a second survey question represented by the second question object is determined. As shown in FIG. 3B, at 324, the second question object is moved to the filter region. At 326, the second question object and the second percentage are displayed in the filter region. At 328, a third percentage representing a correlation between the first percentage and the second percentage is determined. In some implementations, the third percentage is determined in response to and at the time of the second question object being moved to the filter region. At 330, a second location, in the percentage region, that represents the third percentage is identified. At 332, the first question object is moved from the first location to the second location.

At 334, an input to move a third question object from the survey question region to the filter region is detected. At 336, a fourth percentage of selections of a fourth answer option to a third survey question represented by the third question object is determined. At 338, a fifth percentage representing a correlation between the second percentage and the fourth percentage is determined. At 340, the third question object is moved to the filter region. At 342, the third question object is displayed in the filter region. At 344, the fifth percentage is displayed in the filter region instead of the second percentage.

As described above, at 306, multiple question objects are displayed in the survey question region in response to the selection of the survey data set. As shown in FIG. 3C, at 346, a selection of the first question object is detected. At 348, multiple correlations between the answer option for the survey question represented by the first question object and an answer option for a survey question represented by each of the remaining question objects is determined. At 350, the multiple correlations are ranked in an order. At 352, the remaining question objects are displayed with visual appearances that correspond to the ranks.

The computer system 100 can implement animations when performing operations associated with one or more question objects, e.g., when moving a question object from one region to another and/or within the same region or when performing other operations. For example, the computer system 100 can animate the display of multiple question objects in the survey question region 202 in response to the detection of the survey data set. In another example, the computer system 100 can animate the movement of a question object from one location to another location in the percentage region 204 in response to the movement of another question object to the filter region 212. In a further example, the computer system 100 can animate the movement of the question objects from either the percentage region 204 or the filter region 212 (or both) to the survey question region 202 in response to the selection of the refresh object 216. In general, the computer system 100 can animate any movement of any question object in response to any input that includes or excludes a selection of the question object.

The computer system 100 can perform the operations associated with the one or more question objects in the real time. In a real-time operation, the computer system 100 implements the operation as immediately as the computer system's processing power allows in response to receiving an input to perform the operation. For example, in response to detecting an input to move a first question object from the survey question region 202 to the percentage region 204, the computer system can, in real time, determine a first percentage of selections of a first answer option to a first survey question represented by the first question object, identify a location in the percentage region 204 that corresponds to the determined percentage, and display the first question object at the determined location. In another example, in response to detecting an input to move a second question object from the survey question region 202 to the filter region 212, the computer system 100 can, in real time, determine a second percentage of selections of a second answer option to a second survey question represented by the second question object and display the second question object and the determined percentage in the filter region 212. Also, in real time, the computer system 100 can determine a third percentage that represents a correlation between the first percentage and the second percentage, determine a new location in the percentage region 204 that corresponds to the third percentage, and move the first question object to the new location.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium, for example, the computer-readable medium 104, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical and/or non-transitory components or media (for example, multiple CDs, disks, or other storage devices).

In some implementations, the operations described in this disclosure can be implemented as a hosted service provided on a server in a cloud computing network. For example, the computer-readable storage media can be logically grouped and accessible within a cloud computing network. Servers within the cloud computing network can include a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. The system can use cloud-based services to quickly receive software upgrades, applications, and other resources that would otherwise require a lengthy period of time before the resources can be delivered to the system.

The operations described in this disclosure can be implemented as operations performed by a data processing apparatus on data stored on one or more computer-readable storage devices or received from other sources. The term "data processing apparatus" encompasses all kinds of apparatuses, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages and declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media, and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube) or LCD (liquid crystal display) monitor, for displaying information to the user, and a keyboard, a pointing device, for example, a mouse or a trackball, or a microphone and speaker (or combinations of them) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a back-end component, for example, as a data server, or that includes a middleware component, for example, an application server, or that includes a front end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this disclosure contains many specific implementation details, these should not be construed as limitations on the scope of any implementations or of what may be claimed, but rather as descriptions of features specific to particular implementations of particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory computer-readable medium storing instructions executable by one or more computer systems to perform operations comprising:
    displaying a user interface including a first region and a second region comprising a percentage area and a filter area;
    displaying, in the first region and by the one or more computer systems, a plurality of question objects associated with a completed survey, each question object representing a survey question and an answer option associated with a particular answer option from a set of available answer options for the survey question, the survey question and the answer option included in a survey data set associated with the completed survey that includes a plurality of survey questions, a plurality of answers for each survey question, and a number of selections of each answer for each survey question;
    detecting, by the one or more computer systems, user input received via the user interface of a selection of a first question object from the first region for display in the percentage area of the second region;
    in response to detecting the user input of the selection of the first question object, displaying, by the one or more computer systems, the first question object in a first location of the percentage area of the second region, the first location of the percentage area representing a first percentage representing a percentage of selections of a first particular answer option to a first survey question from the set of available answer options for the first survey question represented by the first question object;
    detecting, by the one or more computer systems, user input received via the user interface associated with a move of a second question object from the first region to a location within the filter area of the second region, the second question object associated with a first particular answer option to a second survey question from a set of available answer options for the second survey question;
    in response to detecting the user input associated with the move of the second question object to the location within the filter area of the second region:
        displaying the second question object in the filter area of the second region;
        determining, automatically and without user input, a second percentage representing a correlation between the first particular answer option associated with the first question object and the first particular answer option associated with the second question object, the second percentage comprising an updated percentage from the first percentage;
        identifying a second location in the percentage area of the second region that represents the second percentage; and
        moving, automatically and without user input, the first question object from the first location in the percentage area of the second region to the second location in the percentage area of the second region.

2. The medium of claim 1, wherein the operations further comprise:
    detecting a selection of the first question object in the percentage area of the second region; and
    displaying the first percentage and the second percentage in the percentage area of the second region in response to detecting the selection of the first question object in the percentage area of the second region.

3. The medium of claim 1, wherein the operations further comprise:
    detecting a selection of the second question object in the filter area of the second region; and
    in response to detecting the selection of the second question object in the filter area of the second region, displaying, within the second question object, a plurality of available answer options for the second survey question represented by the second question object, the plurality of available answer options including the first particular answer option from the set of available answer options for the second survey question.

4. The medium of claim 3, wherein the operations further comprise:

detecting a selection of a second particular answer option different from the first particular answer option in the set of available answer options for the second survey question; and in response to detecting the selection of the second particular answer option, determining a third percentage representing a correlation between the first particular answer option associated with the first question object and the second particular answer option associated with the second question object.

5. The medium of claim 4, wherein the operations further comprise:

identifying a third location in the percentage area of the second region that represents the correlation between the third percentage and the first percentage; and moving the first question object to the third location.

6. The medium of claim 1, wherein, when the plurality of question objects is displayed in the first region, the operations further comprise:

detecting a selection of the first question object;

in response to detecting the selection of the first question object:

determining a plurality of correlations, each being a correlation between the first particular answer option for the survey question represented by the first question object and a default answer option for each survey question represented by one of the remaining question objects;

ranking the plurality of correlations in an order; and displaying the remaining question objects with visual appearances that correspond to ranks of the plurality of correlations.

7. A system comprising:

one or more computer systems comprising at least one processor; and a computer-readable medium storing instructions executable by the at least one processor of the one or more computer systems to perform operations comprising:

displaying a user interface including a first region and a second region comprising a percentage area and a filter area;

displaying, in the first region and by the one or more computer systems, a plurality of question objects associated with a completed survey, each question object representing a survey question and an answer option associated with a particular answer option from a set of available answer options for the survey question, the survey question and the answer option included in a survey data set associated with the completed survey that includes a plurality of survey questions, a plurality of answers for each survey question, and a number of selections of each answer for each survey question;

detecting, by the one or more computer systems, user input received via the user interface of a selection of a first question object from the first region for display in the percentage area of the second region;

in response to detecting the user input of the selection of the first question object, displaying, by the one or more computer systems, the first question object in a first location of the second region, the first location representing a first percentage of selections of a first answer option to a first survey question represented by the first question object; displaying, by the one or more computer systems, the first question object in a first location of the percentage area of the second region, the first location of the percentage area representing a first percentage representing a percentage of selections of a first particular answer option to a first survey question from the set of available answer options for the first survey question represented by the first question object;

detecting, by the one or more computer systems, user input received via the user interface associated with a move of a second question object from the first region to a location within the filter area of the second region, the second question object associated with a first particular answer option to a second survey question from a set of available answer options for the second survey question;

in response to detecting the user input associated with the move of the second question object to the location within the filter area of the second region:

displaying the second question object in the filter area of the second region;

determining, automatically and without user input, a second percentage representing a correlation between the first particular answer option associated with the first question object and the first particular answer option associated with the second question object, the second percentage comprising an updated percentage from the first percentage;

identifying a second location in the percentage area of the second region that represents the second percentage; and moving, automatically and without user input, the first question object from the first location in the percentage area to the second location in the percentage area.

8. The system of claim 7, wherein the operations further comprise:

detecting a selection of the first question object in the percentage area of the second region; and displaying the first percentage and the second percentage in the percentage area of the second region in response to detecting the selection of the first question object in the percentage area of the second region.

9. The system of claim 7, wherein the operations further comprise:

detecting a selection of the second question object in the filter area of the second region; and in response to detecting the selection of the second question object in the filter area of the second region, displaying, within the second question object, a plurality of available answer options for the second survey question represented by the second question object, the plurality of available answer options including the first particular answer option from the set of available answer options for the second survey question.

10. The system of claim 9, wherein the operations further comprise:

detecting a selection of a second particular answer option different from the first particular answer option in the set of available answer options for the second survey question; and in response to detecting the selection of the second particular answer option, determining a third percentage representing a correlation between the first particular answer option associated with the first question object and the second particular answer option associated with the second question object.

11. The system of claim 10, wherein the operations further comprise:

identifying a third location in the percentage area of the second region that represents the correlation between the third percentage and the first percentage; and moving the first question object to the third location.

12. The medium of claim 1, wherein moving the first question object from the first location in the percentage area of the second region to the second location in the percentage area of the second region comprises displaying a placeholder object at the first location in the percentage area of the second region representing the location of the first question object prior to the move.

13. The medium of claim 1, wherein moving the first question object from the first location in the percentage area of the second region to the second location in the percentage area of the second region comprises presenting an animation of the movement of the first question object from the first location in the percentage area of the second region to the second location in the percentage area of the second region.

14. A computerized method executed by at least one hardware processor, the method comprising:

displaying a user interface including a first region and a second region comprising a percentage area and a filter area;

displaying, in the first region, a plurality of question objects associated with a completed survey, each question object representing a survey question and an answer option associated with a particular answer option from a set of available answer options for the survey question, the survey question and the answer option included in a survey data set associated with the completed survey that includes a plurality of survey questions, a plurality of answers for each survey question, and a number of selections of each answer for each survey question;

detecting user input received via the user interface of a selection of a first question object from the first region for display in the percentage area of the second region;

in response to detecting the user input of the selection of the first question object, displaying the first question object in a first location of the percentage area of the second region, the first location of the percentage area representing a first percentage representing a percentage of selections of a first particular answer option to a first survey question from the set of available answer options for the first survey question represented by the first question object;

detecting user input received via the user interface associated with a move of a second question object from the first region to a location within the filter area of the second region, the second question object associated with a first particular answer option to a second survey question from a set of available answer options for the second survey question;

in response to detecting the user input associated with the move of the second question object to the location within the filter area of the second region:

displaying the second question object in the filter area of the second region; determining, automatically and without user input, a second percentage representing a correlation between the first particular answer option associated with the first question object and the first particular answer option associated with the second question object, the second percentage comprising an updated percentage from the first percentage;

identifying a second location in the percentage area of the second region that represents the second percentage; and moving, automatically and without user input, the first question object from the first location in the percentage area of the second region to the second location in the percentage area of the second region.

15. The method of claim 14, further comprising:

detecting a selection of the first question object in the percentage area of the second region; and displaying the first percentage and the second percentage in the percentage area of the second region in response to detecting the selection of the first question object in the percentage area of the second region.

16. The method of claim 14, further comprising:

detecting a selection of the second question object in the filter area of the second region; and in response to detecting the selection of the second question object in the filter area of the second region, displaying, within the second question object, a plurality of available answer options for the second survey question represented by the second question object, the plurality of available answer options including the first particular answer option from the set of available answer options for the second survey question.

17. The method of claim 16, further comprising:

detecting a selection of a second particular answer option different from the first particular answer option in the set of available answer options for the second survey question; and in response to detecting the selection of the second particular answer option, determining a third percentage representing a correlation between the first particular answer option associated with the first question object and the second particular answer option associated with the second question object.

18. The method of claim 17, further comprising:

identifying a third location in the percentage area of the second region that represents the correlation between the third percentage and the first percentage; and moving the first question object to the third location.

19. The method of claim 14, wherein, when the plurality of question objects is displayed in the first region, the method further comprises:

detecting a selection of the first question object;

in response to detecting the selection of the first question object:

determining a plurality of correlations, each being a correlation between the first particular answer option for the survey question represented by the first question object and a default answer option for each survey question represented by one of the remaining question objects;

ranking the plurality of correlations in an order; and displaying the remaining question objects with visual appearances that correspond to ranks of the plurality of correlations.

* * * * *